United States Patent [19]

Farhangi et al.

[11] Patent Number: 4,493,106
[45] Date of Patent: Jan. 8, 1985

[54] IMAGE DIGITIZING SYSTEMS

[75] Inventors: Hassan Farhangi, Manchester; Peter R. Miles, Cheadle; Costas N. Daskalakis, Manchester, all of England

[73] Assignee: International Computers Limited, London, England

[21] Appl. No.: 363,764

[22] Filed: Mar. 31, 1982

[30] Foreign Application Priority Data

Dec. 24, 1981 [GB] United Kingdom ............... 8138875

[51] Int. Cl.³ .............................................. G06K 9/00
[52] U.S. Cl. ....................................... 382/41; 382/51
[58] Field of Search ......................... 382/4, 18, 51, 41; 340/722; 358/166, 282, 284; 364/553–555

[56] References Cited

U.S. PATENT DOCUMENTS

| 3,918,049 | 11/1975 | Snyder et al. | 382/51 |
| 4,003,024 | 1/1977 | Riganati et al. | 382/4 |
| 4,075,604 | 2/1978 | Degasperi | 382/18 |
| 4,345,314 | 8/1982 | Melamud et al. | 382/51 |
| 4,365,304 | 12/1982 | Ruhman et al. | 382/51 |

FOREIGN PATENT DOCUMENTS

| 1080226 | 8/1967 | United Kingdom . |
| 1340485 | 12/1973 | United Kingdom . |
| 1504675 | 3/1978 | United Kingdom . |
| 1513401 | 6/1978 | United Kingdom . |
| 2052922 | 1/1981 | United Kingdom . |
| 2079567 | 1/1982 | United Kingdom . |

Primary Examiner—Leo H. Boudreau
Attorney, Agent, or Firm—Lee, Smith & Zickert

[57] ABSTRACT

An image is scanned by a TV camera 9 and the resultant signal digitized in an analogue to digital converter 12 the output of which represents the measured intensity of each picture element of the image. The values relating to selected lines may be captured in a line store 13. Alternatively the number of picture elements of a selected intensity may be counted during the count of a scan in a level counter 14, using a look-up table 15 as a mask to select the desired level. After all levels have been similarly counted the resultant histogram is modified by mapping each intensity into a new value with a smaller number of bits in such a way as to tend to equalize the number of picture elements in each new level. The new values are loaded into the look-up table 15 and in subsequent scans the measured intensities are converted into the new values, which may be displayed on a monitor 16 or captured in the line store 13.

7 Claims, 4 Drawing Figures

IMAGE DIGITIZING SYSTEMS

BACKGROUND OF THE INVENTION

This invention relates to systems for digitising images. Digitisation is required for example if the image is acquired in analogue form and it is desired to make it amenable to computer analysis or processing.

One such method of acquiring the image is by the use of a scanning camera such as a television camera. That scans an optically formed image in a raster pattern and outputs a varying analogue signal that at each moment represents the optical intensity and/or colour, hereinafter referred to as "display value", of the spot of the image reached by the scan. The analogue signal may then be digitised by being passed to an analogue to digital converter which repeatedly converts the momentary analogue value to the equivalent digital value. The successive digital values then define the intensity and/or colour of each of the different picture elements into which the image may be regarded as being divided.

All the digitised values must be stored if they are to be used by other digital equipment. Hitherto, that has required a store which is both large enough to accept all the digitised data and fast enough to allow values to be loaded at the rate they are produced in response to the scan. If the scan is reasonably fast, as for example with a television camera, that has required a very fast store which for the amount of data involved is very expensive.

SUMMARY OF THE INVENTION

This invention provides a system for digitising an image comprising:

means arranged repeatedly to scan an image and on each scan to output an analogue signal representing the image;

conversion means arranged periodically to convert the analogue signal to a digital signal output from the conversion means, the successive values of which signal represent an intensity and/or color for each individual picture element of the image;

accumulation means arranged to be operative during a scan to accumulate information derived from the digital signals output from the conversion means, which information relates only to picture elements meeting a selected criterion; and selection means setable to select the said criterion.

The invention also provides a method of digitising an image which comprises repeatedly scanning an image and on each scan outputting an analogue signal representing the image, periodically converting the analogue signal to a digital signal the successive values of which each represent an intensity and/or colour for an individual picture elements of the image, and in the course of a scan accumulating information derived from the values of the said digital signals and relating only to picture elements meeting a selected criterion.

The invention may be applied in different ways. For example the information accumulated at the end of a scan may consist of the values of digital signals output by the conversion means and representing some only of the picture elements of the display, the criterion relating to the position of those picture elements. As an alternative, the information may be a function of the display as a whole, for example a count.

BRIEF DESCRIPTION OF THE DRAWINGS

An example of a system constructed and operating in accordance with the invention will now be described with reference to the accompanying drawings, in which.

DESCRIPTION OF THE PREFERRED EMBODIMENT

Outline of the system

Figure 1:
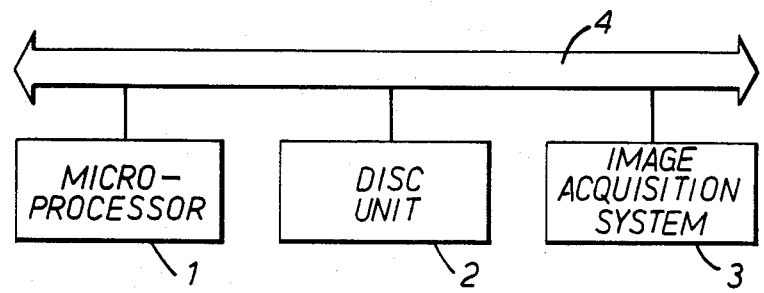
FIG. 1 is a block diagram of the overall system.

Referring to FIG. 1, the overall system is microprocessor-based. It contains a microprocessor 1 (together with storage modules), a disc unit 2 and an image acquisition system 3, all interconnected by a bus 4. The purpose of the image acquisition system 3 is to capture images, especially of real objects, for analysis or processing, either by itself or by the microprocessor system 1 or another computer system.

Figure 2:
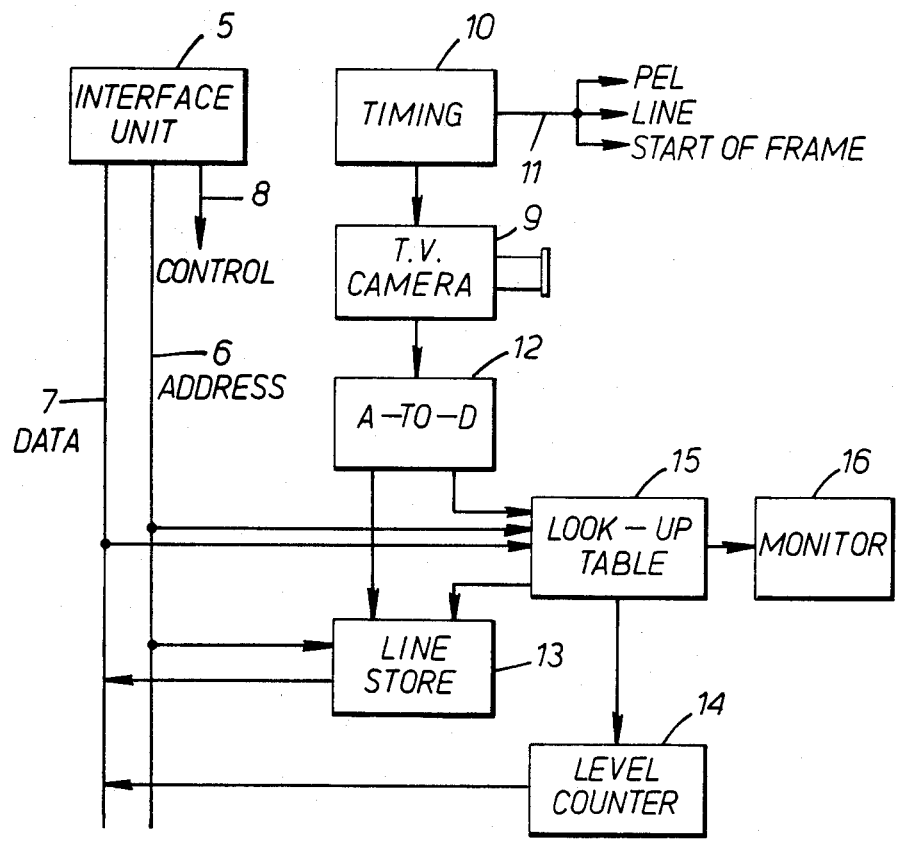
FIG. 2 is a block diagram of the image acquisition unit.

The image acquisition system 1 is shown in outline in FIG. 2. It is connected to the bus 4 through an interface unit 5, which interconnects the data lines of the bus 4 with its own data lines 6 and supplies addressing signals derived from the address lines of the bus 4 to the units of the image acquisition system 3 on lines 7. The interface unit 5 also passes on control signals. In particular it contains a control register, the individual outputs of which on lines 8 enable the individual units and data paths of the image acquisition system. Thus by writing the appropriate control word into this control register the microprocessor 1 can control which units of the image acquisition system 3 are involved at any time in its operation.

The image acquisition system 3 contains a raster-scan camera 9, for example a conventional television camera. It is used to capture the image that is to be digitised for processing or analysis. It may photograph real objects, photographic slides or prepared drawings as desired. Conventional timing and sync signals are supplied to the camera 9 from a circuit 10, which also supplies timing signals on lines 11 to the remainder of the image acquisition system, including in particular a signal LINE that indicates the start of each scan line and a clock signal PEL that is operative only during the period that the scan is actually moving across the image.

The camera 9 scans its field of view along parallel lines and outputs a varying analogue voltage dependent on the instantaneous optical intensity of the spot it is observing. This voltage passes to an analogue-to-digital converter 12 which in response to each PEL timing signal converts the received analogue signal to its digital equivalent (subject in the usual way to quantising errors and an upper limit). The set of digital values output during the complete scan forms a digitised representation of the image; each value defines the intensity of a so-called "picture element" separated (assuming a horizontal scan) from its vertical neighbours by the distance between the centres of adjacent scan lines and from its horizontal neighbours by a distance equivalent to the time between successive conversion instants, that is the period of the PEL signal.

The output of the A-to-D converter 12 is used (at different times) in three different ways. First, it can be passed to a line store 13. The line store 13 is set to receive the values relating to a particular scan line. When in the course of the next scan that line is reached the converted digital values of each picture element of the line are stored in the line store 13. After the scan line has been completed the values are transferred to the remainder of the microprocessor system, for example for storage in the disc unit 2. The line store 13 is then reset to repeat the process for the next scan line. In this manner the entire digitised image may be transferred from the image acquisition system 3 to the disc unit 2 for subsequent analysis or processing.

The A-to-D converter 12 may for example quantise the image to 6-bit accuracy, giving 64 grey levels for a monochrome image. But it may be desired to use an image quantised to fewer levels, using say three bits to give eight levels. That result could be achieved simply by truncating the digitised value, but significant information might be lost as a consequence. The system being described uses a form of a procedure known as histogram modification in order to increase the amount of information that is retained. In histogram modification the number of picture elements of each grey level is counted to give the grey-level histogram. The initial grey levels are then assigned to new grey levels in a way chosen to achieve a particular result. In the type of modification used in this system the initial grey levels are assigned to a final number of fewer grey levels in such a manner as, as far as possible, to equalise the number of picture elements in each grey level. Thus, if a large number of picture elements have grey levels that are close together, truncating will tend to lump them together and render them indistinguishable, but the type of histogram modification used will spread out the intensity range they occupy and retain the distinguishability of a greater number of picture elements.

Both the other two uses of the D-to-A converter output are concerned with this process. In one, the output is directed to a level counter 14 which is arranged to count the number of picture elements in each grey level. (The output is in fact passed, as will be explained, through a look-up table 15 which is set to specify the level to be counted.) The numbers of picture elements in the different grey level are counted in separate scans. In any one scan the number of picture elements in one particular grey level is counted and the result is passed to the microprocessor 1. The procedure is then repeated for the next grey level. In this manner the entire grey-level histogram is obtained. The microprocessor 1 will then carry out the calculations to modify the histogram and determine to which of the final, fewer, number of grey levels each original grey level should be assigned. That having been done the result is written in the look-up table 15. This table has (using the numbers given as an example) 64 locations, one for each of the 64 levels provided by the A-to-D converter's six-bit output. The microcprocessor 1 stores in each location the three-bit number defining which of the final eight grey levels a picture element whose original grey level is the address of that location should have.

Thereafter, the output of the A-to-D converter 12 is used to address the look-up table 15. Hence each original grey level from the A-to-D converter 12 is mapped into a different grey level. This process is carried out continuously as the camera 9 repeatedly scans the original image so that the mapping takes place in real time.

The result may be viewed on a monitor 16. Additionally, the redigitised values can be transferred to the rest of the microprocessor system a line at a time via the line store 13 in the same way as occurred with the original digitised values.

Line Store

Figure 3:
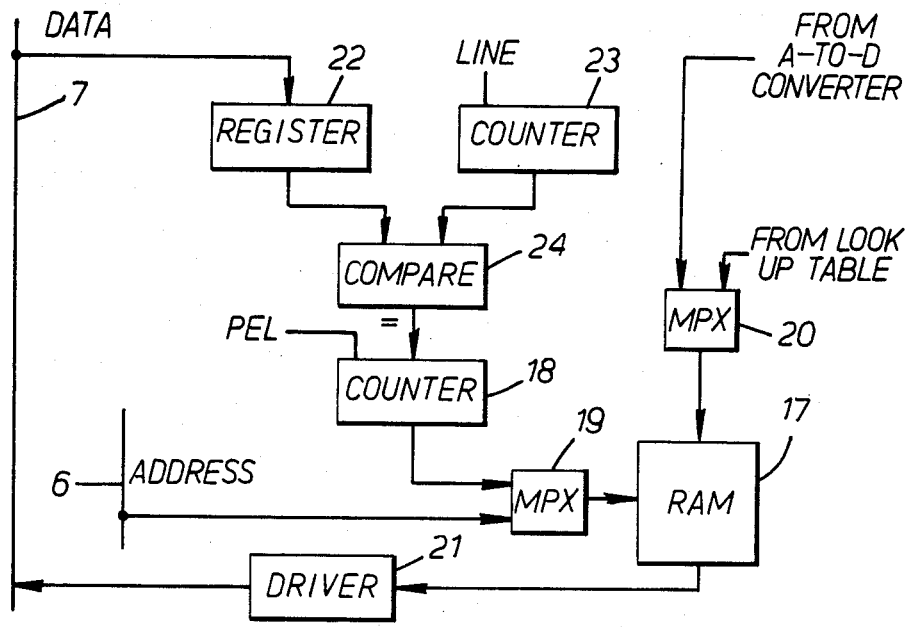
FIG. 3 is a block diagram of the line store.

The line store will now be described in more detail with reference to FIG. 3. The data relating to a scan line is held in a RAM 17, which has two sources of addressing signals, a counter 18 and the address lines 6. The desired source is selected by a multiplexer 19. Data to be written into the RAM 17 comes either from the A-to-D converter 12 or from the look-up table 15, as selected by a multiplexer 20. Data read out of the RAM 17 is transferred through a bus driver 21 to the data lines 7.

Assume now that it is desired to capture the digitised values of a particular scan line. First, immediately following a start-of-frame signal, but before the scan starts, the microprocessor writes the address of the desired scan line into a register 22 from the data lines 7. A counter 23 is then clocked up from zero in response to the LINE signal, which indicates the start of each line. It therefore holds the number of the line currently being scanned. When the number of the current scan line equals that set in the counter 23 a comparator 24 indicates that equality has been reached and enables the counter 18. That is clocked once per picture element in response to the PEL signal and its contents address the RAM 17 through the multiplexer 19. At the same time the digitised values for the line are presented to the RAM 17 through the multiplexer 20. They are therefore written into locations in the RAM 17 at incrementing addresses as supplied by the counter 18.

When the counter 18 has reached the full number of picture elements in a scan line it is disabled and cleared. When the next start-of-frame signal is received the processor will be aware that the scan has been completed and the RAM 17 holds a line's-worth of data. It then reads this data out one picture element at a time, supplying the required addresses on the address lines 6 and receiving the data output onto the lines 7. The entire process is repeated for each scan line in turn to allow the digitised data for the whole image to be transferred to the microprocessor, which may for example store it in the disc unit 2 (which need not of course be dedicated to the image acquisition system).

An identical procedure is followed if it is desired to transfer digitised data after mapping to fewer grey levels, except that the multiplexer 20 is set to supply mapped values from the look-up table 15 to be written into the RAM 17.

Look-up table and level counter

Figure 4:
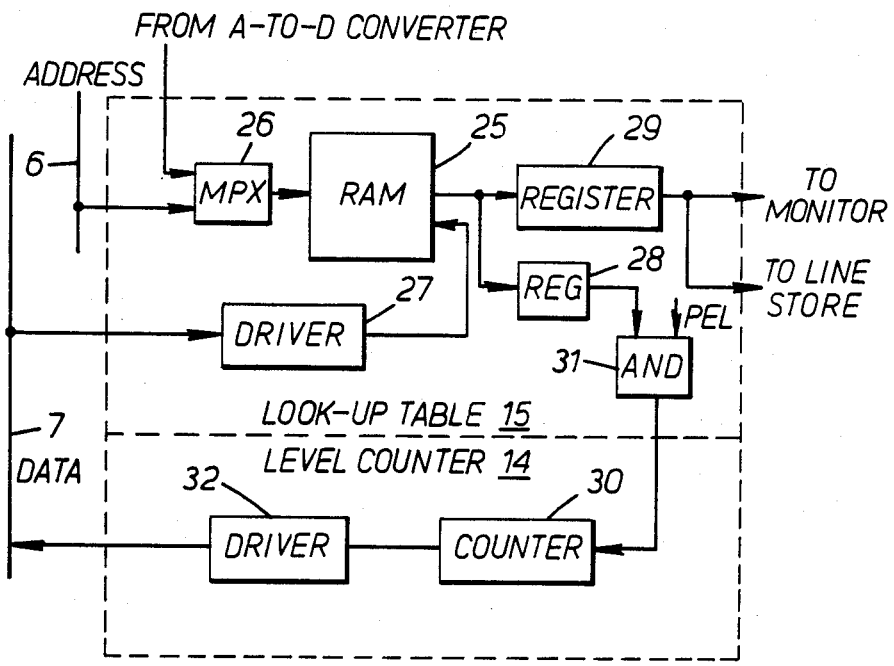
FIG. 4 is a block diagram of the look-up table and level counter.

The look-up table 15 and level counter 14 will now be described in more detail with reference to FIG. 4.

The look-up table 15 consist essentially of a RAM 25 which may be addressed through a multiplexer 26 either by signals on the address lines 6 or by output of the A-to-D converter 12. The RAM 25 has common data input/output lines connected to the data lines 7 through a bidirectional bus driver 27, and also connected to registers 28 and 29 which latch data read from the RAM 25. These two registers hold respectively the most significant bit and the remaining (less significant) bits output when the RAM 25 is read.

In normal operation of the image acquisition system 3 the camera 9 scans its field of view continuously and the A-to-D converter 12 converts its output to digitised values. These values continuously address the RAM 25 and lead to the stored values being read out. The less-significant bits held in the register 29 are the value defining the new grey level corresponding to the grey level used to address the RAM 17 and are supplied to the monitor 16 so that the image is displayed in its mapped form in synchronism with the camera's scan.

The most significant bit of each location is also continuously read out as the scan proceeds, but is used for a rather different purpose, namely in masking out unwanted grey levels during level counting.

During level-counting the system operates as follows for each of the original quantisation levels in turn. First, the microprocessor writes a 1 into the most significant bit of that location of the RAM 25 whose address is equal to the value of the level concerned and a zero into all other locations. A counter 30, constituting the fundamental part of the level counter 14, is then enabled in response to the next start-of-frame signal. The RAM 25 is set to be addressed by the output of the A-to-D converter 12 and read following each digital conversion. Each time the digitised value equals the desired level the value read out will have 1 as its most significant bit. These bits are supplied to the counter 30 and the 1s are counted to record the number of picture elements of that quantisation level.

Since consecutive picture elements which are all at the desired grey level will give an unchanging output from the register 28 its output is chopped by being combined in an AND gate 31 with the PEL clock signal to ensure a separate signal for each picture element for the counting process.

After the end of the scan the counter 30 is disabled in response to the next start-of-frame signal, which also acts as a signal to the microprocessor 1 that the count is available to be transferred. The transfer to the data lines 6 takes place through a bus driver 32.

The same procedure is then followed for the next grey level. After all the levels have been counted the microprocessor calculates the new levels and writes them into the RAM 25. The method used may for example be as described in "Digital Image Processing" by W. K. Pratt, published by John Wiley and Sons, 1978.

General

Once level counting has been carried out and the look-up table loaded the system allows the mapping of the original digital values into the new values to be carried out in real time as the image is scanned, with the results displayed on the monitor 16. Alternatively or in addition the mapped values may be transferred to the microprocessor for storage or further processing. For example the mapped data may be compressed into a more compact representation.

The operator may if he desires alter the mapping by causing the microprocessor 1 to change one or more of the stored values, with immediate observation of the results. Such a change might be desired, for example, to modify the histogram in a different way, or if it appeared that noise was distorting the level count.

If there are 512 picture elements in a scan line digitisation must take place about once every 100 nanoseconds for a standard TV scan. Flash-type analogue-to-digital converters are currently available which operate at a sufficient rate.

Random-access memories as used in microprocessor systems currently normally have an access time of some 450 nanoseconds, which is too slow to accept digitised data at the rate it is created. However, more expensive random access memories are available, with access times of for example 45-55 nanoseconds. Such memories may be used for the look-up table and line store. The line store can then capture the data relating to one line at the rate it is created and the microprocessor retrieve it at a rate it can accept. Digital values are therefore produced at a rate appropriate to the camera scan and captured with a relatively small expenditure on fast storage compared to that needed to accept the complete image at the rate it is produced.

It will be realised that the system described with reference to the drawings applies the invention in three different ways. First, during the level counting, it accumulates in the counter 30 at the end of each scan during which counting takes place, information (the count) relating to all those elements whose grey level equals the predetermined value defined by the location of the look-up table that is holding 1 in its most significant bit. In the other two ways of applying the invention the information is accumulated in the line store and consists of the digitised values—either from the original digitisation or after mapping—defining the intensity of each picture element in a predetermined scan line defined by the value set in the counter 22.

Various modifications may be made. The camera may be free-running, in which case its output must be fed to a sync separator circuit from which timing signals for the rest of the image acquisition signal may be extracted.

The line store may be replaced by storage with sufficient capacity for more than one line, for example two lines. That decreases the time taken to capture a whole scan at the expense of more fast storage. A double-line store is especially convenient if the microprocessor 1 is to compress the mapped data in a manner making use of the relationship between consecutively scanned lines.

The system described uses the look-up table during level counting as a means of masking out the wanted grey-levels. That is an advantageous solution since it readily allows a fast comparison with equipment already present. But if desired a register and comparator could be used.

At the cost of a much slower capture of the digitised data relating to individual picture elements, the picture elements whose grey levels are stord at the end of a single scan need not be consecutive. They may for example be one per scan line, in which case data is collected in columns.

In the place of the black-and-white monitor 16 showing the new levels as shades of grey, it can be advantageous to use a colour monitor, the three bits of the new grey level defining the on-off states of the red, blue and green guns. With the resulting pseudocolour display the operator can assign certain colours to different parts of the image to improve the contrast.

Instead of counting the number of elements in each grey level it is possible to count the number either equalling or exceeding each level in turn. And the count of the final grey level may be omitted since the total number of picture elements are known. In both cases the information accumulated is enough to allow the grey-level histogram to be derived.

We claim:
1. A system for digitising an image comprising:

means arranged repeatedly to scan an image and on each scan to output an analogue signal representing the image;

conversion means arranged periodically to convert the analogue signal to a digital signal output from the conversion means, the successive values of which signal represent a display value for each individual picture element of the image;

counting means arranged to be operative during each of a plurality of scans to accumulate a count of the number of picture elements in the entire image whose display values meet a selected criterion;

selection means settable to select the said criterion; and means for resetting the setting for the said selection means between scans of the said plurality in such a manner as to ensure that at the end of the said plurality of scans the sequence of counts accumulated during the said plurality of scans suffices to define a display-value histogram for the picture elements of the image.

2. A system as claimed in claim 1 in which:

the selection means comprises storage means addressed in operation by the said digital signal;

each possible value of the digital signal causing the contents of a corresponding location of the storage means to be read out;

each of the said locations being loadable with a bit to thereby select the display value represented by the value of the digital signal to which that location corresponds;

the said bits when read out being supplied to the said counting means for counting.

3. A system as claimed in claim 2, in which each of the said locations is loadable in addition with a transformed display value, which value is read out when the storage means is addressed by the value of the said digital signal to which its location corresponds.

4. A method of digitising an image which comprises repeatedly scanning an image and on each scan outputting an analogue signal representing the image, periodically converting the analogue signal to a digital signal the successive values of which represent a display value for each individual picture element of the image, and in the course of each of a plurality of scans accumulating a count of the number of picture elements in the entire image whose display values meet a selected criterion, the criterion being varied in successive scans of the said plurality in such a manner that the sequence of counts accumulated during the said plurality of scans suffices to define a display-value histogram for the picture elements of the image.

5. A method as claimed in claim 4, in which the selection is achieved by applying the said digital signal as an addressing signal to storage means, any location of which that corresponds to a value of the digital signal representing a display value that is to be selected being loaded with a bit.

6. A method as claimed in claim 5, in which each of the said locations is loadable in addition with a transformed display value, which value is read out when the storage means is addressed by the value of the said digital signal to which its location corresponds.

7. A method of obtaining a digitised transformed representation of an image which comprises repeatedly scanning an image, on each scan producing an analogue signal representing the image, and periodically converting the analogue signal to an equivalen binary signal the successive values of which each represent a display value for an individual picture element of the image, in a first stage in each of a plurality of scans counting the number of picture elements in the entire image meeting a selected criterion relating to the display value of the picture elements, the criterion being varied between scans of the said plurality of scans in such a manner that at the end of the said plurality of scans the information that has been accumulated suffices to define the number of picture elements of each display value, and calculating for each value of the binary signal a corresponding transformed display value, and then in a subsequent second stage converting, for at least a complete scan of the image, each value of the binary signal to its corresponding transformed display value.

* * * * *